United States Patent
Hederstad et al.

(10) Patent No.: US 9,500,267 B2
(45) Date of Patent: Nov. 22, 2016

(54) DRIVE MODULE WITH COMPACT DIFFERENTIAL MECHANISM

(71) Applicant: e-AAM Driveline Systems AB, Trollhättan (SE)

(72) Inventors: Magnus Hederstad, Trollhättan (SE); Erik J. Sten, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 0 days.

(21) Appl. No.: 14/633,736

(22) Filed: Feb. 27, 2015

(65) Prior Publication Data

US 2016/0252171 A1 Sep. 1, 2016

(51) Int. Cl.
*F16H 37/08* (2006.01)
*F16H 48/11* (2012.01)
*F16H 1/28* (2006.01)
*F16H 3/58* (2006.01)
*F16H 48/10* (2012.01)

(52) U.S. Cl.
CPC ............. *F16H 48/11* (2013.01); *F16H 1/28* (2013.01); *F16H 3/58* (2013.01); *F16H 37/082* (2013.01); *F16H 2048/106* (2013.01); *F16H 2048/108* (2013.01)

(58) Field of Classification Search
None
See application file for complete search history.

(56) References Cited

U.S. PATENT DOCUMENTS

| | | | | |
|---|---|---|---|---|
| 4,831,890 A | * | 5/1989 | Valentin | F16H 48/285 475/227 |
| 5,518,464 A | * | 5/1996 | Teraoka | F16H 48/285 475/249 |
| 5,637,050 A | * | 6/1997 | Chludek | F16H 48/285 475/249 |

(Continued)

FOREIGN PATENT DOCUMENTS

| | | |
|---|---|---|
| DE | 811650 C | 8/1951 |
| DE | 102004015278 A1 | 10/2005 |

(Continued)

OTHER PUBLICATIONS

International Search Report and Written Opinion mailed May 19, 2016.

*Primary Examiner* — Dirk Wright
(74) *Attorney, Agent, or Firm* — Harness, Dickey & Pierce, P.L.C.

(57) ABSTRACT

A drive module that includes an electric motor, an input pinion driven by the electric motor, a transmission driven by the input pinion, a planetary differential assembly and first and second axle shafts. The transmission has a first transmission output member. The planetary differential assembly has an input ring gear, a first output sun gear and a second output sun gear. The first and second output sun gears have different pitch diameters, different modules and a common quantity of sun gear teeth. The planetary differential assembly is configured to provide a 50-50 torque split between the first and second output sun gears. The first axle shaft is coupled to the first output sun gear for rotation therewith. The second axle shaft is coupled to the second output sun gear for rotation therewith.

18 Claims, 6 Drawing Sheets

(56) References Cited

U.S. PATENT DOCUMENTS

| | | | | |
|---|---|---|---|---|
| 6,484,834 | B2 * | 11/2002 | Bowen | B60K 6/365 |
| | | | | 180/65.25 |
| 7,867,125 | B2 * | 1/2011 | Kim | B60K 6/36 |
| | | | | 475/150 |
| 8,057,352 | B2 * | 11/2011 | Nishiji | F16H 48/285 |
| | | | | 475/180 |
| 8,480,532 | B2 | 7/2013 | Biermann et al. | |
| 8,998,765 | B2 * | 4/2015 | Sten | F16H 48/36 |
| | | | | 475/150 |
| 2009/0188732 | A1 | 7/2009 | Janson | |
| 2009/0215576 | A1 | 8/2009 | Nishiji | |
| 2013/0203543 | A1 | 8/2013 | Sten | |

FOREIGN PATENT DOCUMENTS

| | | |
|---|---|---|
| DE | 102013205175 A1 | 9/2014 |
| EP | 0301704 A1 | 2/1989 |

\* cited by examiner

DRIVE MODULE WITH COMPACT DIFFERENTIAL MECHANISM

FIELD

The present disclosure relates to a drive module with a compact differential mechanism.

BACKGROUND

This section provides background information related to the present disclosure which is not necessarily prior art.

Drive modules with one or more electric motors that are selectively operable to provide propulsion and/or torque vectoring capabilities are known in the art. For example, U.S. Patent Application Publication No. 2013/0203543 discloses several drive modules that employ one or more motors to provide propulsion and/or torque vectoring capabilities to a pair of rear vehicle wheels in a vehicle having a pair of permanently driven front wheels. The drive modules of the '543 publication commonly employ a differential device having a differential gearset with bevel gears. While such configuration is suited for its intended purpose, we have noted that it can be difficult in some situations to package a drive module of these types into some vehicles due to the overall length (in the lateral direction of the vehicle) of these drive modules. Accordingly, there remains a need in the art for a drive module that can be more easily packaged into a vehicle.

SUMMARY

This section provides a general summary of the disclosure, and is not a comprehensive disclosure of its full scope or all of its features.

In one form, the present teachings provide a drive module that includes an electric motor, an input pinion driven by the electric motor, a transmission driven by the input pinion, a planetary differential assembly and first and second axle shafts. The transmission has a first transmission output member. The planetary differential assembly receives rotary power from the first transmission output member and has a plurality of first planet gears, a plurality of second planet gears, a differential planet carrier, a first output sun gear and a second output sun gear. The first planet gears are compound gears having a first gear portion, which is meshingly engaged with the first output sun gear, and a second gear portion that is coupled for rotation to the first gear portion. The second gear portion has a pitch diameter that is smaller than a pitch diameter of the first gear portion such that the second gear portion is not meshingly engaged with the first output sun gear. The first planet gears are supported for rotation by the differential planet carrier. Each of the second planet gears is meshingly engaged with the second output sun gear and a corresponding one of the second gear portions. The second planet gears are supported for rotation by the differential planet carrier and are not meshed to the first output sun gear. The first and second output sun gears having different pitch diameters, different modules and a common quantity of sun gear teeth. The first axle shaft is coupled to the first output sun gear for rotation therewith. The second axle shaft is coupled to the second output sun gear for rotation therewith.

In another form, the present teachings provide a drive module that includes a planetary differential assembly and first and second axle shafts. The planetary differential assembly has a plurality of first planet gears, a plurality of second planet gears, a differential planet carrier, a first output sun gear and a second output sun gear. The first planet gears are compound gears having a first gear portion, which is meshingly engaged with the first output sun gear, and a second gear portion that is coupled for rotation to the first gear portion. The second gear portion has a pitch diameter that is smaller than a pitch diameter of the first gear portion such that the second gear portion is not meshingly engaged with the first output sun gear. The first planet gears are supported for rotation by the differential planet carrier. Each of the second planet gears being meshingly engaged with the second output sun gear and a corresponding one of the second gear portions. The second planet gears are supported for rotation by the differential planet carrier and are not meshed to the first output sun gear. The first and second output sun gears having different pitch diameters, different modules and a common quantity of sun gear teeth. The first axle shaft is coupled to the first output sun gear for rotation therewith. The second axle shaft is coupled to the second output sun gear for rotation therewith.

In yet another form, the present teachings provide a drive module that includes an electric motor, an input pinion driven by the electric motor, a transmission driven by the input pinion, a planetary differential assembly and first and second axle shafts. The transmission has a first transmission output member. The planetary differential assembly has an input ring gear, a first output sun gear and a second output sun gear. The first and second output sun gears have different pitch diameters, different modules and a common quantity of sun gear teeth. The planetary differential assembly is configured to provide a 50-50 torque split between the first and second output sun gears. The first axle shaft is coupled to the first output sun gear for rotation therewith. The second axle shaft is coupled to the second output sun gear for rotation therewith.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
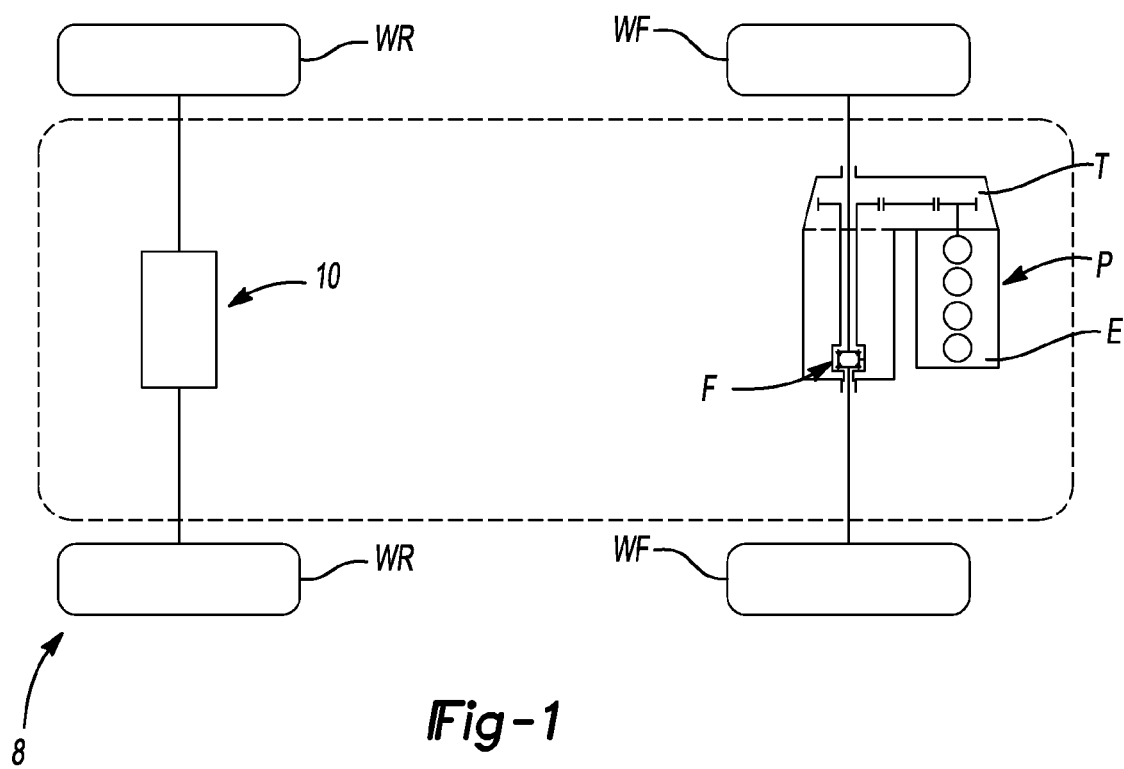
FIG. 1 is a schematic illustration of a vehicle having a drive module constructed in accordance with the teachings of the present disclosure.

With reference to FIG. 1 of the drawings, an exemplary vehicle 8 is depicted with a power train P, a conventional front-wheel drive drivetrain F that is driven by the power train P, and a drive module 10 that is constructed in accordance with the teachings of the present disclosure. The power train P can include an internal combustion engine E and a transmission T that is driven by the engine. The transmission T can output rotary power to the front-wheel drivetrain F, which can transmit rotary power to drive a pair of front vehicle wheels WF. The drive module 10 can be selectively operated to transmit rotary power to a pair of rear vehicle wheels WR.

Figure 2:
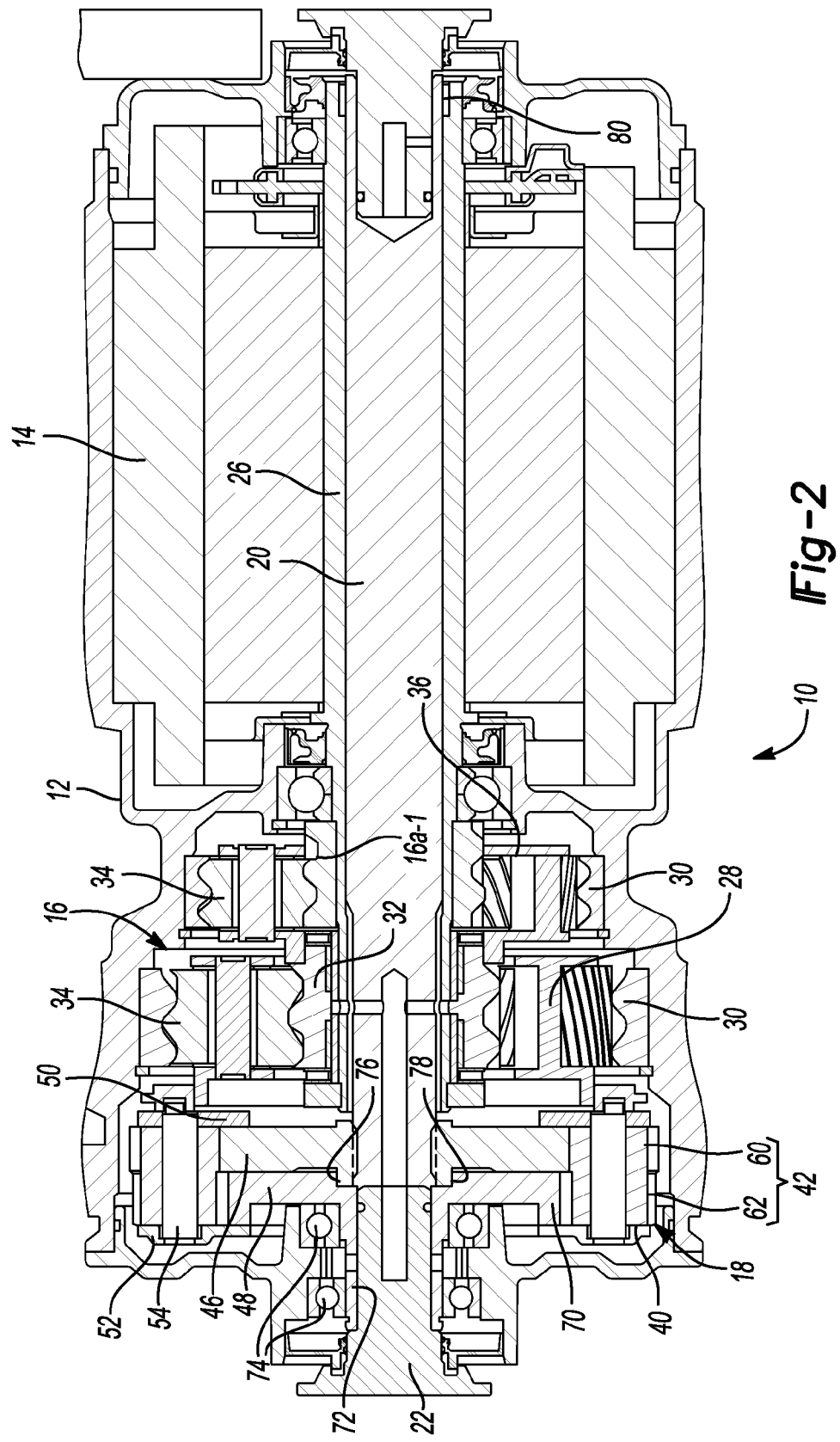
FIG. 2 is a section view of the drive module of FIG. 1 taken longitudinally along a rotational axis of an output shaft of an electric motor of the drive module.

With reference to FIG. 2, the drive module 10 is shown to include a housing 12, an electric motor 14, an input pinion 16a-1 that is driven by the electric motor 14, a transmission 16, a planetary differential assembly 18, and first and second axle shafts 20 and 22. The housing 12 can define a structure in which the input pinion, the transmission 16 and the planetary differential assembly 18 can be housed. The electric motor 14 can be fixedly coupled to the housing 12 and can include a hollow output shaft 26 to which the input pinion 16a-1 can be coupled for rotation.

It will be appreciated that any type of transmission arrangement could be employed between the electric motor 14 and the differential assembly 18. In the particular example provided, the transmission 16 is be a two-stage planetary transmission in which the input pinion 16a-1 is an input sun gear of an input planetary stage of the transmission 16 and a (transmission) planet carrier 28 of an output planetary stage of the transmission 16 is the output of the transmission 16. In the example illustrated, each planetary stage of the transmission includes a ring gear 30, which is non-rotatably coupled to the housing 12, a sun gear (i.e., input pinion 16a-1 or sun gear 32), a plurality of planet gears 34, which are meshingly engaged with the ring gear 30 and the sun gear (i.e., either input pinion 16a-1 or sun gear 34) of the planetary stage, and a planet carrier (i.e, planet carrier 28 or planet carrier 36). The sun gear 32 of the output planetary stage of the transmission 16 can be rotatably mounted on the output shaft 26 of the electric motor 14. The planet carrier 36 of the input planetary stage of the transmission 16 can be coupled to the sun gear 32 of the output planetary stage of the transmission 16. Accordingly, it will be appreciated that the planet carrier 36 is the output of the input planetary stage and that the sun gear 32 is the input of the output planetary stage.

Figure 3:
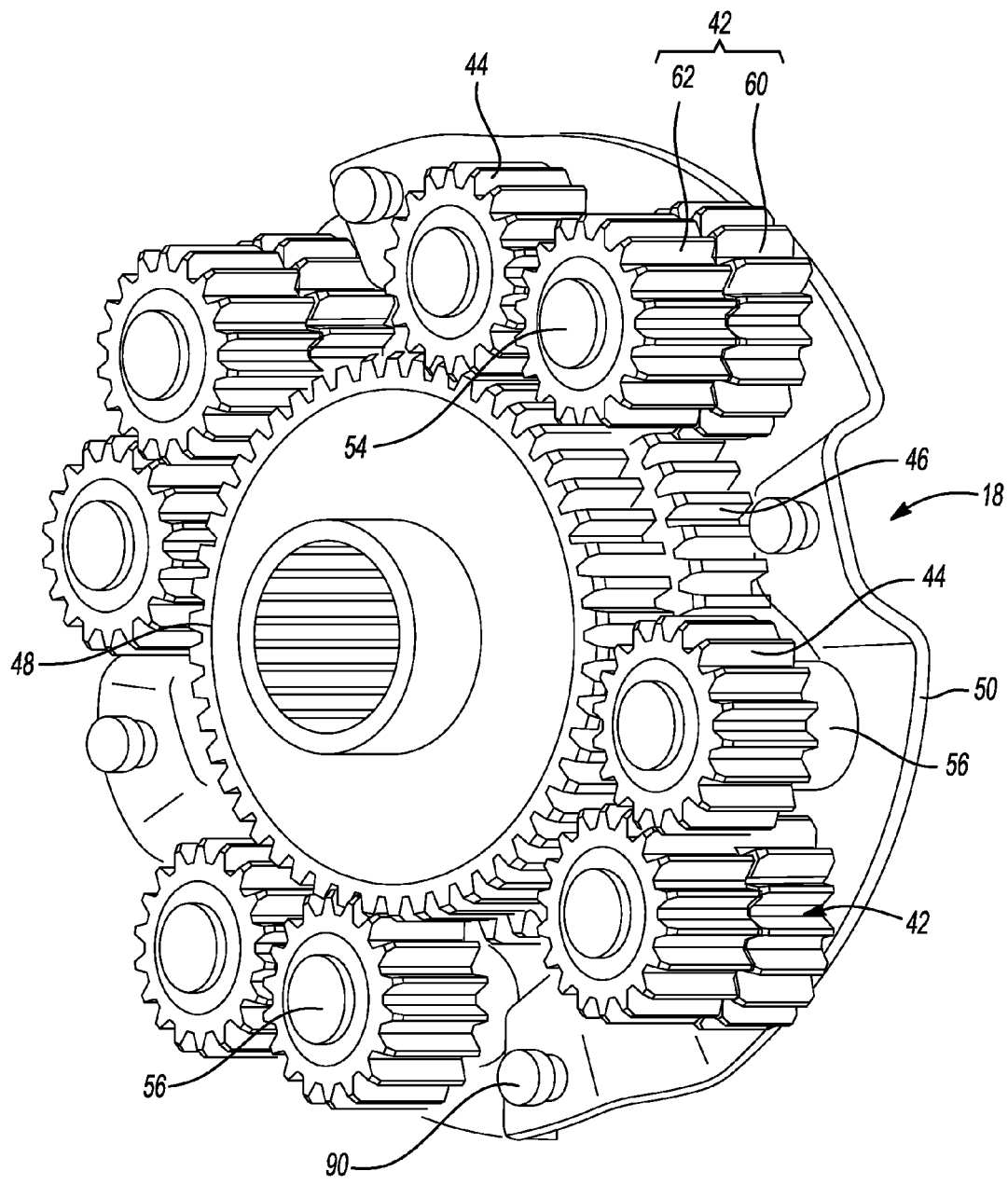
FIG. 3 is a perspective view of a portion of the drive module of FIG. 1, illustrating a portion of a planetary differential assembly in more detail.
Figure 4:
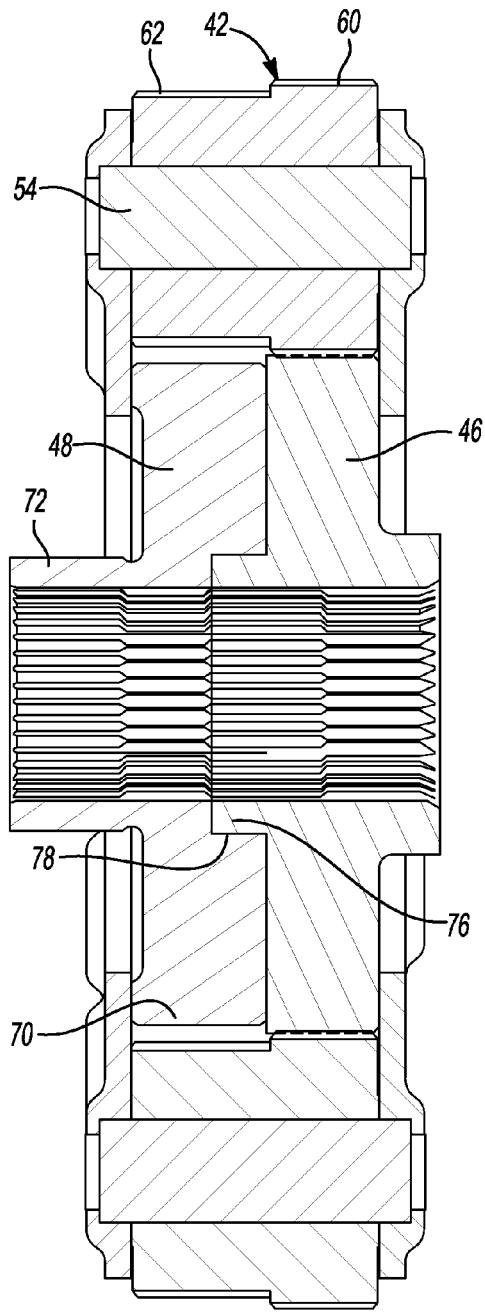
FIG. 4 is a longitudinal section view of the planetary differential assembly.

With reference to FIGS. 2-4, the planetary differential assembly 18 can include a differential planet carrier 40, a plurality of first planet gears 42, a plurality of second planet gears 44, a first output sun gear 46 and a second output sun gear 48.

The differential planet carrier 40 can include first and second carrier bodies 50 and 52, respectively, a plurality of first carrier pins 54 and a plurality of second carrier pins 56. The first and second carrier pins 56 can be fixedly coupled to the first and second carrier bodies 50 and 52 to define a space between the first and second carrier bodies 50 and 52 into which the first and second planet gears 42 and 44 can be mounted. The differential planet carrier 40 can receive rotary power from the output of the transmission 16. In the particular example provided, the first carrier body 50 of the differential planet carrier 40 is coupled to the planet carrier 28 of the output planetary stage of the transmission 16 for common rotation.

Figure 5:
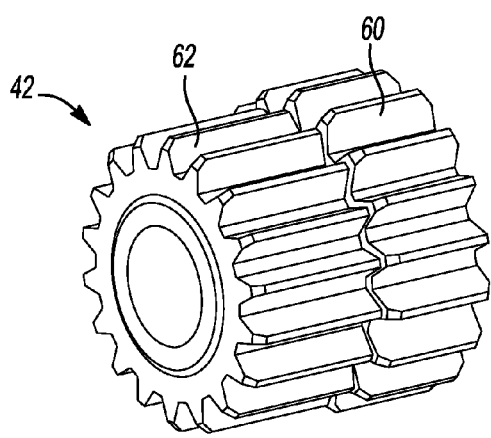
FIG. 5 is a perspective view of a portion of the planetary differential assembly, illustrating a first planet gear in more detail.

With reference to FIGS. 3 and 5, each of the first planet gears 42 can be rotatably disposed on an associated one of the first carrier pins 54 and can be a compound gear having a first gear portion 60, which is meshingly engaged with the first output sun gear 46, and a second gear portion 62 that is coupled for rotation with the first gear portion 60. The second gear portion 62 can have a pitch diameter that is smaller than a pitch diameter of the first gear portion 60 and is not meshed with the first output sun gear 46 or the second output sun gear 48. The first and second gear portions 60 and 62 need not have equal quantities of teeth, but in the particular example provided, the first and second gear portions 60 and 62 have an equal number of teeth and the teeth of the first and second gear portions 60 and 62 are radially aligned (e.g., tip-to-tip and root-to-root) to one another.

With reference to FIG. 3, each of the second planet gears 44 can be rotatably disposed on an associated one of the second carrier pins 56 and can be meshingly engaged with the second output sun gear 48 and a corresponding one of the second gear portions 62. The second planet gears 44 do not mesh with the first output sun gear 46. The second gear portions 60 and the second planet gears 44 need not have equal quantities of teeth, but in the particular example provided, the second gear portions 60 and the second planet gears 44 have an equal number of teeth.

Figure 6A:
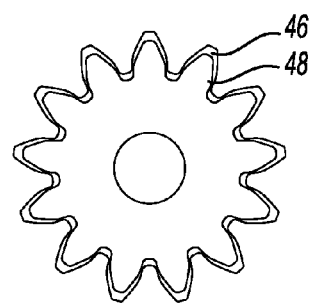
FIG. 6A is a side elevation view of a portion of the planetary differential assembly, illustrating first and second output sun gears as defined by a module shift.
Figure 6B:
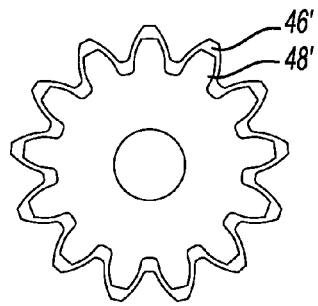
FIG. 6B is a side elevation view similar to that of FIG. 6A but depicting the first and second output sun gears as defined by a profile shift.

With reference to FIG. 6A, the first and second output sun gears 46 and 48 can have different pitch diameters, different modules (i.e., different spacings between their teeth) and a common quantity of sun gear teeth (i.e., the number of teeth of the first output sun gear 46 is equal to the number of teeth of the second output sun gear 48). The shift in the module of the teeth between the first and second output sun gears 46 and 48 is specifically shown in FIG. 6A, whereas FIG. 6B illustrates the first and second output sun gears 46' and 48' were their teeth to be formed using a shift in the tooth profile (i.e., profile shift) as opposed to a shift in the module (i.e., module shift) that is illustrated in FIG. 6A.

With reference to FIGS. 2 and 4, the second output sun gear 48 can include a gear portion 70 and an annular bearing collar 72 that can extend from the gear portion 70. A pair of bearings 74 can be mounted to the bearing collar 72 and the housing 12 and can support the bearing collar 72 for rotation relative to the housing 12. The first output sun gear 46 can include a hub 76 that can be received into a counterbore 78 that is formed in the second output sun gear 48. The hub 76 and the counterbore 78 can be sized such that receipt of the hub 76 into the counterbore 78 aligns a rotational axis of the first output sun gear 46 to a rotational axis of the second output sun gear 48. A needle bearing 80 (FIG. 2) can be employed to support the first axle shaft 20 for rotation relative to the output shaft 26 of the electric motor 14 at a location on the first axle shaft 20 that is spaced laterally away from the first output sun gear 46.

The first axle shaft 20 can be received axially through the hollow output shaft 26 of the electric motor 14 and can be coupled to the first output sun gear 46 for rotation therewith. The second axle shaft 22 can be coupled to the second output sun gear 48 for rotation therewith. In the particular example provided, each of the first and second axle shafts 20 and 22 has a plurality of male spline teeth that matingly engage female spline teeth that are formed into the first and second output sun gears 46 and 48, respectively.

With reference to FIGS. 3 and 5, movement of the first and second output sun gears 46 and 48 along their rotational axes away from one another can be limited by the differential planet carrier 40. More specifically, the first and second carrier bodies 50 and 52 can abut laterally outer surfaces formed on the first and second output sun gears 46 and 48, respectively. If desired, a thrust washer can be disposed between the first and second output sun gears 46 and 48. The first and second carrier pins 54 and 54 can be employed to secure the first and second carrier bodies 50 and 52 to one another. Additionally or alternatively, a plurality of fasteners 90, such as threaded fasteners or rivets can be employed to fixedly couple the first and second carrier bodies 50 and 52 to one another.

Figure 7:
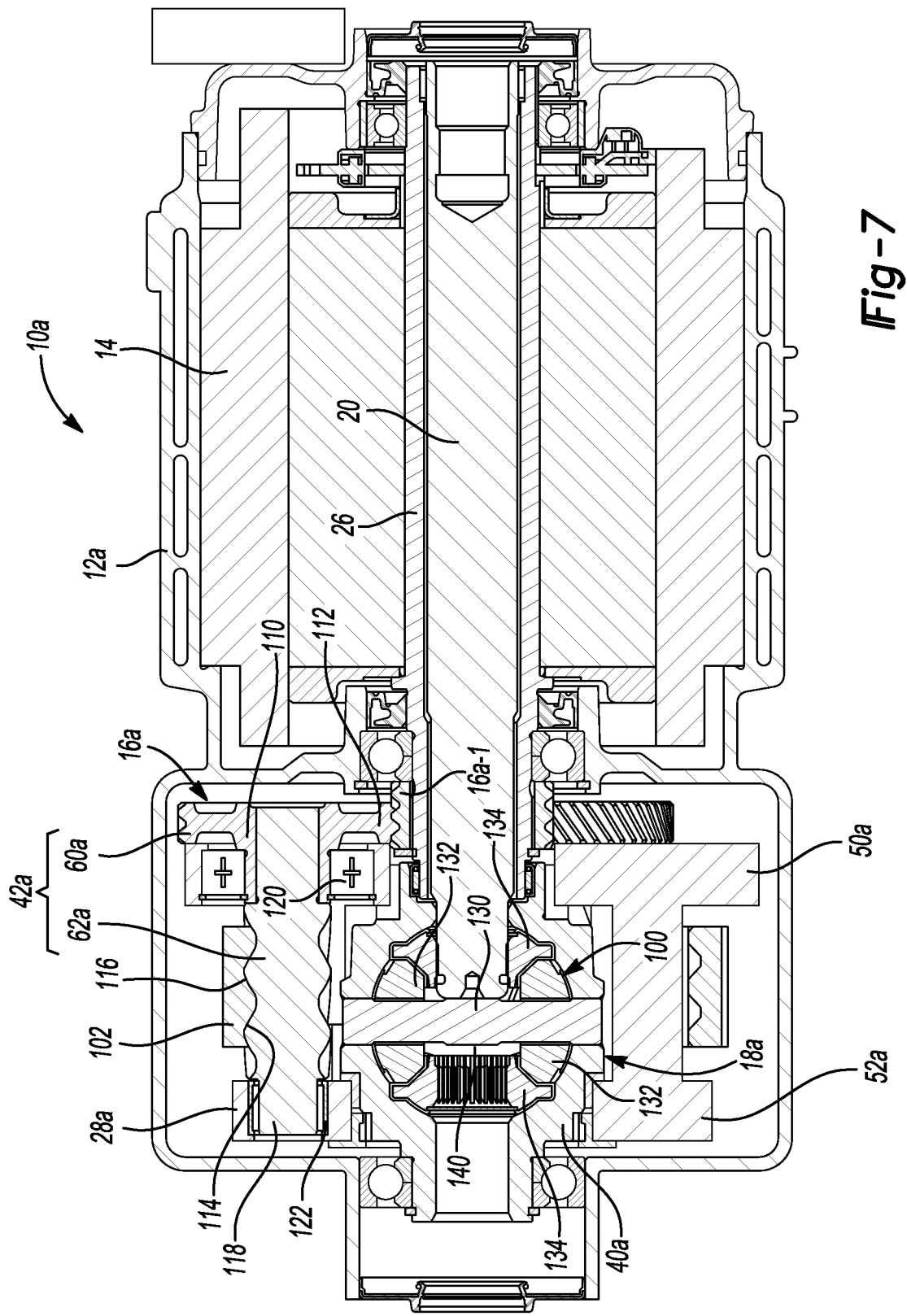
FIG. 7 is a section view of an alternately constructed drive module taken longitudinally along a rotation axis of an output shaft of an electric motor of the drive module.
Figure 8:
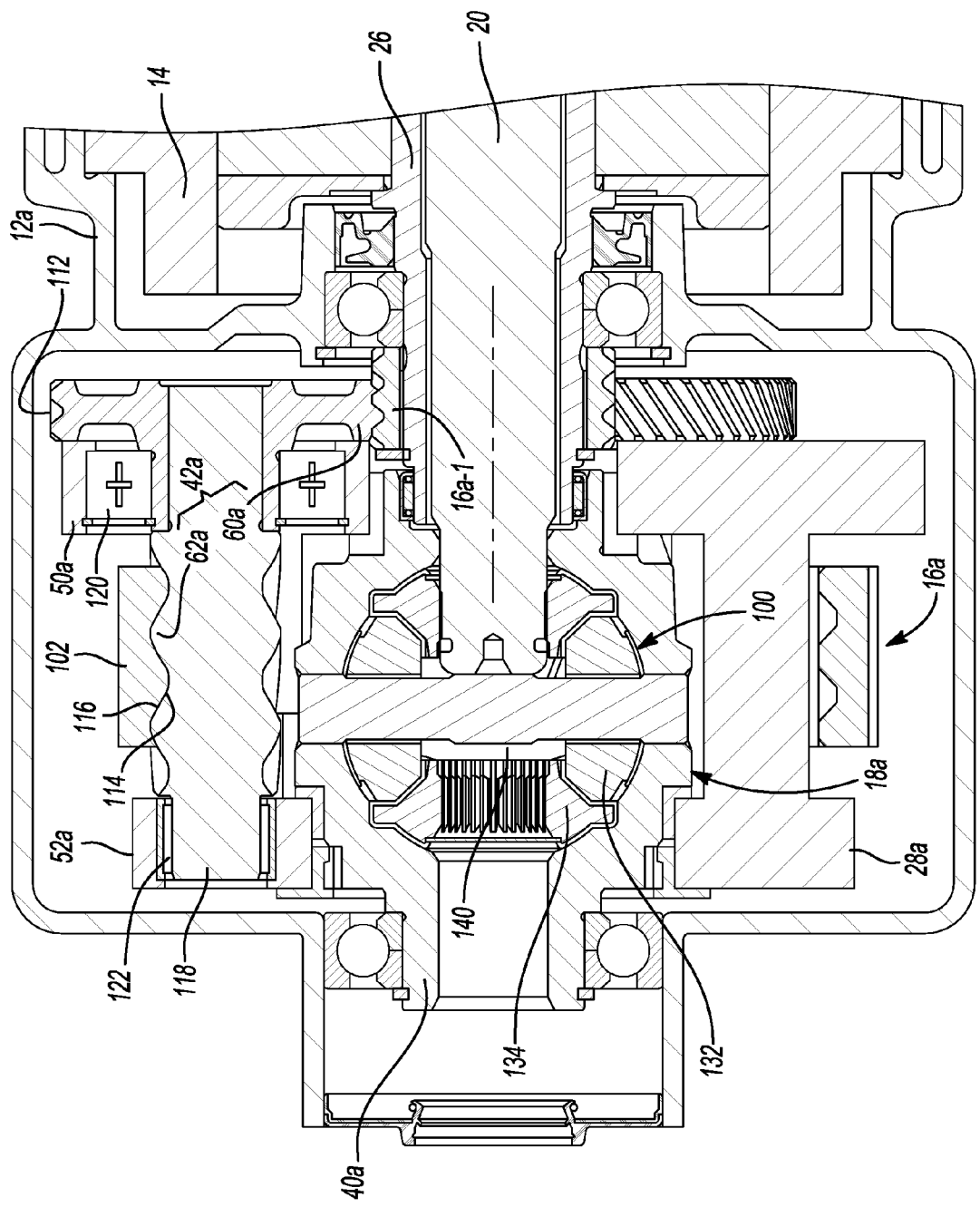
FIG. 8 is an enlarged portion of FIG. 7.

An alternately constructed drive module 10a is illustrated in FIGS. 7 and 8 as being similar to the drive module 10 of FIG. 7, except that the transmission 16a comprises a single planetary stage and the differential assembly 18a comprises a differential carrier 40a and differential gearing 100.

The planetary transmission 16a is disposed concentrically about the rotational axis of the hollow output shaft 26 of the electric motor 14 and includes the input pinion 16a-1, which is a sun gear of the planetary transmission 16a and is mounted on the output shaft 26 of the electric motor 14 for rotation therewith, a ring gear 102, a plurality of compound planet gears 42a and a planet carrier 28a. The ring gear 102 is disposed concentrically about the input pinion 16a-1 and is non-rotatably coupled to a housing 12a in which the planetary transmission 16a and the differential assembly 18a are received. Each of the compound planet gears 42a comprises a first planet gear portion 60a and a second planet gear portion 62a. The first planet gear portion 60a includes a hub 110 and a plurality of teeth 112 that are disposed about the hub 110 and meshingly engaged to the input pinion 16a-1. The second planet gear portion 62a is fixedly coupled to the hub 110 of the first planet gear portion 60a for rotation therewith and includes a plurality of teeth 114, which are meshingly engaged to the teeth 116 of the ring gear 102, and a journal 118 that is disposed on an axial end that is opposite the end that is coupled to the hub 110. The first and second planet gear portions 60a and 62a have different pitch diameters. The planet carrier 28a comprises a first carrier body 50a, a second carrier body 52a, a plurality of first bearings 120, and a plurality of second bearings 122. The first bearings 120, which can be ball bearings, can be fixedly mounted to the first carrier body 50a and can support the hubs 110 of the first planet gear portions 60a for rotation relative to the first carrier body 50a. The second bearings 122, which are roller needle bearings, are fixedly mounted to the second carrier body 52a and support the journal 118 of the second planet gear portions 62a for rotation relative to the second carrier body 52a.

The differential gearset 100 can have a cross-pin 130, a plurality of bevel pinions 132, and a pair of side gears 34. The differential carrier 40a can be coupled to the first carrier body 50a and/or the second carrier body 52a for rotation therewith about the rotational axis of the output shaft 26 and can define a cavity 140 into which the bevel pinions 132 and the side gears 134 are received. The cross-pin 130 is coupled to the differential carrier 40a perpendicular to the rotational axis of the output shaft 26. The bevel pinions 132 are rotatably mounted on the cross-pin 130. The side gears 134 are rotatable about the rotational axis of the output shaft 26 and are meshingly engaged with the bevel pinions 132.

Each of the first and second axle shafts 20 and 22 is coupled to a corresponding one of the side gears 134 for rotation therewith. The first axle shaft 20 extends through the hollow output shaft 26 of the electric motor 14.

It will be appreciated that the transmission 16a could be employed in the embodiment of FIG. 2 in lieu of the transmission 16 (FIG. 2) and that the transmission 16 of FIG. 2 could be employed in the embodiment of FIG. 7 in lieu of the transmission 16a.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A drive module comprising:
   an electric motor;
   an input pinion driven by the electric motor;
   a transmission driven by the input pinion, the transmission having a first transmission output member;
   a planetary differential assembly having, a plurality of first planet gears, a plurality of second planet gears, a differential planet carrier, a first output sun gear and a second output sun gear, the differential planet carrier having a carrier body, a plurality of first carrier pins and a plurality of second carrier pins, the planetary differential assembly receiving rotary power from the first transmission output member, the first planet gears being compound gears having a first gear portion, which is meshingly engaged with the first output sun gear, and a second gear portion that is coupled for rotation to the first gear portion, the second gear portion having a pitch diameter that is smaller than a pitch diameter of the first gear portion such that the second gear portion is not meshingly engaged with the first output sun gear, the first planet gears being supported for rotation by the first carrier pins of the differential planet carrier, each of the second planet gears being meshingly engaged with the second output sun gear and a corresponding one of the second gear portions, the second planet gears being supported for rotation by the second carrier pins of the differential planet carrier and not being meshed to the first output sun gear, the first and second output sun gears having different pitch diameters, different modules and a common quantity of sun gear teeth;
   a first axle shaft coupled to the first output sun gear for rotation therewith; and
   a second axle shaft coupled to the second output sun gear for rotation therewith.

2. The drive module of claim 1, wherein the first and second gear portions of the first planet gears have an equal number of gear teeth.

3. The drive module of claim 2, wherein the second gear portions of the first planet gears and the second planet gears have an equal number of gear teeth.

4. The drive module of claim 1, wherein the second gear portions of the first planet gears and the second planet gears have an equal number of gear teeth.

5. The drive module of claim 1, wherein the transmission comprises at least one planetary reduction.

6. The drive module of claim 5, wherein each of the at least one planetary reductions has a ring gear that is fixedly coupled to a housing into which the transmission is received.

7. The drive module of claim 5, wherein the at least one planetary reduction has a transmission planet carrier and wherein the transmission planet carrier is the first transmission output member.

8. The drive module of claim 7, wherein the differential planet carrier is an input member of the planetary differential assembly.

9. The drive module of claim 1, wherein the differential planet carrier is an input member of the planetary differential assembly.

10. The drive module of claim 1, wherein the transmission provides a two-stage reduction between the electric motor and an input of the planetary differential assembly.

11. The drive module of claim 10, wherein the transmission comprises a planetary reduction with a compound planet gear, the compound planet gear having a first gear portion, which is meshed to the input pinion, and a second gear portion that is coupled to the first gear portion for common rotation, the first and second gear portions having different pitch diameters.

12. The drive module of claim 1, wherein the planetary differential assembly is configured to provide a 50-50 torque split between the first and second output sun gears.

13. A drive module comprising:
a planetary differential assembly having a plurality of first planet gears, a plurality of second planet gears, a differential planet carrier, a first output sun gear and a second output sun gear, the differential planet carrier having a carrier body, a plurality of first carrier pins and a plurality of second carrier pins, the first planet gears being compound gears having a first gear portion, which is meshingly engaged with the first output sun gear, and a second gear portion that is coupled for rotation to the first gear portion, the second gear portion having a pitch diameter that is smaller than a pitch diameter of the first gear portion such that the second gear portion is not meshingly engaged with the first output sun gear, the first planet gears being supported for rotation by the first carrier pins of the differential planet carrier, each of the second planet gears being meshingly engaged with the second output sun gear and a corresponding one of the second gear portions, the second planet gears being supported for rotation by the second carrier pins of the differential planet carrier and not being meshed to the first output sun gear, the first and second output sun gears having different pitch diameters, different modules and a common quantity of sun gear teeth;
a first axle shaft coupled to the first output sun gear for rotation therewith; and
a second axle shaft coupled to the second output sun gear for rotation therewith.

14. The drive module of claim 13, wherein the first and second gear portions of the first planet gears have an equal number of gear teeth.

15. The drive module of claim 14, wherein the second gear portions of the first planet gears and the second planet gears have an equal number of gear teeth.

16. The drive module of claim 13, wherein the second gear portions of the first planet gears and the second planet gears have an equal number of gear teeth.

17. The drive module of claim 13, wherein the planetary differential assembly is configured to provide a 50-50 torque split between the first and second output sun gears.

18. A drive module comprising:
an electric motor;
an input pinion driven by the electric motor;
a transmission driven by the input pinion, the transmission having a first transmission output member;
a planetary differential assembly having an input ring gear, a plurality of first planet gears, a plurality of second planet gears, a differential planet carrier, a first output sun gear and a second output sun gear, the differential planet carrier having a carrier body, a plurality of first carrier pins and a plurality of second carrier pins, the first planet gears being supported for rotation by the first carrier pins of the differential planet carrier, the second planet gears being supported for rotation by the second carrier pins of the differential planet carrier, the first and second output sun gears having different pitch diameters, different modules and a common quantity of sun gear teeth, the planetary differential assembly being configured to provide a 50-50 torque split between the first and second output sun gears;
a first axle shaft coupled to the first output sun gear for rotation therewith; and
a second axle shaft coupled to the second output sun gear for rotation therewith.

* * * * *